United States Patent [19]
Sorenson et al.

[11] 3,911,612
[45] Oct. 14, 1975

[54] APPARATUS FOR DESTROYING SAPYGA WASPS

[76] Inventors: Larry D. Sorenson; Melvin G. Goodson, both of Rte. No. 1, Parma, Idaho 83660

[22] Filed: June 7, 1974

[21] Appl. No.: 477,522

[52] U.S. Cl.................................. 43/132 R; 43/107
[51] Int. Cl.².............................................. A01M 1/04
[58] Field of Search......... 43/107, 113, 121, 58, 60, 43/124, 132 R, 131

[56] References Cited
UNITED STATES PATENTS
1,812,512  6/1931  Carballo .............................. 43/107
1,971,640  8/1934  Cameron .............................. 43/121

*Primary Examiner*—Warner H. Camp
*Attorney, Agent, or Firm*—Clarence A. O'Brien; Harvey B. Jacobson

[57] ABSTRACT

An elongated main passage having an insect attracting entrance at one end and an internal black light at the second end. First barrier means cause a downward movement of the insects with the smaller insects falling into a disposal pan. A second barrier causes movement of the remaining insects along a floor platform to a third angled barrier which laterally directs the larger desirable insects to lateral discharge passages while allowing passage therethrough of the smaller insects, toward the black light, for disposal within an underlying oil pan.

6 Claims, 4 Drawing Figures

APPARATUS FOR DESTROYING SAPYGA WASPS

The present invention generally relates to insect traps, and is more particularly a trap specifically designed so as to trap undesirable insects such as the Sapyga wasp while allowing for the free passage therethrough of insects whose preservation is desired, for example the leafcutter bee.

The leafcutter bee is a primary pollinator of alfalfa hay. However, of late there has been a noticeable decline in the leafcutter bee population. One of the primary reasons for this decline has been a parasite called the Sapyga wasp. Accordingly, it is a primary object of this invention to provide a trap which, while attracting all of the insects in the area, including the leafcutter bees, will provide for a free passage of the leafcutter bees therethrough while trapping and destroying its primary predator the Sapyga wasp.

This separation of the leafcutter bee from the Sapyga wasp is made possible by the fact that the leafcutter bee is relatively larger than the wasp and, through a series of transparent barriers can be effectively laterally discharged from the trap while the relatively smaller wasp moves through the series of barriers toward a source of attraction having a disposal pan immediately adjacent thereto.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
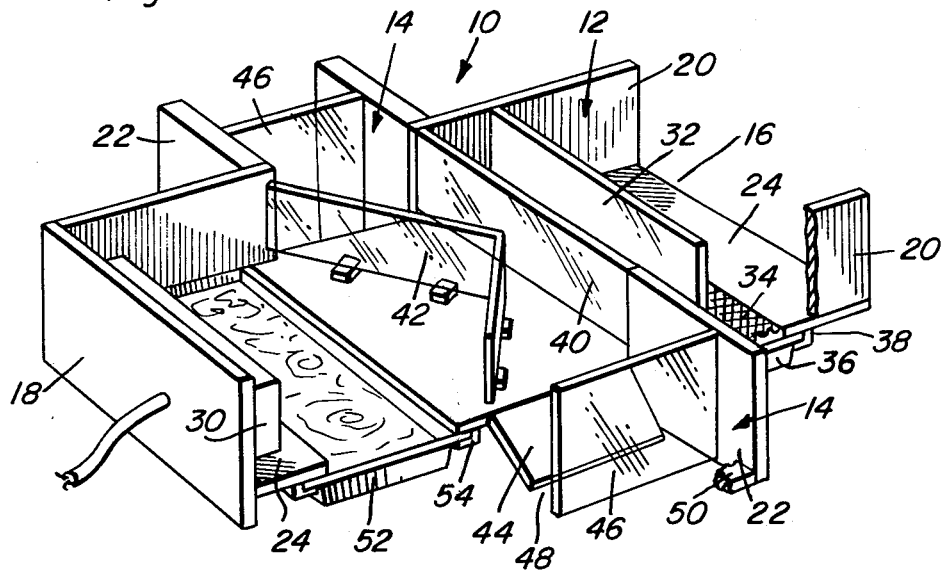
FIG. 1 is a perspective view, with portions of the light excluding enclosure broken away, of the trap.
Figure 4:
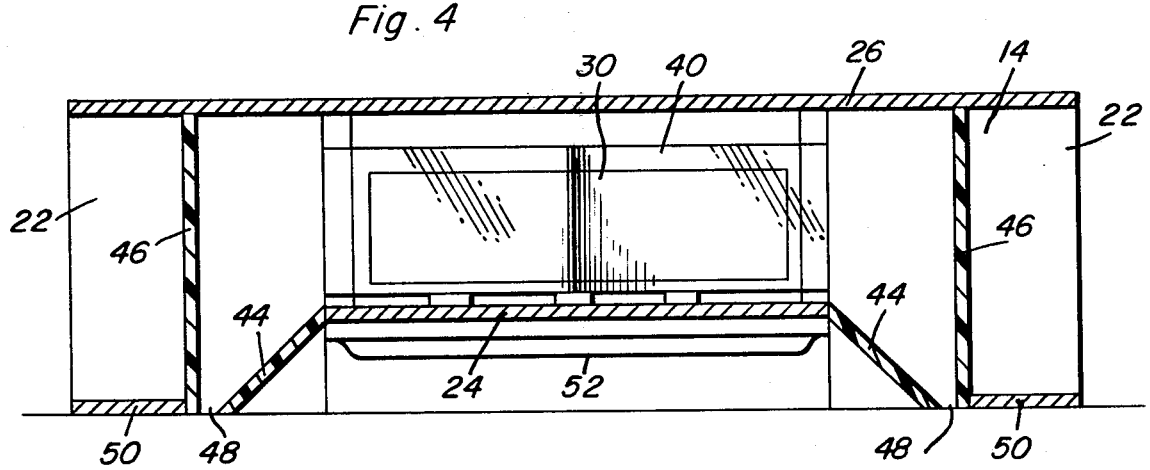
FIG. 4 is a transverse cross-sectional view taken substantially on a plane along line 4—4 in FIG. 2.
Figure 2:
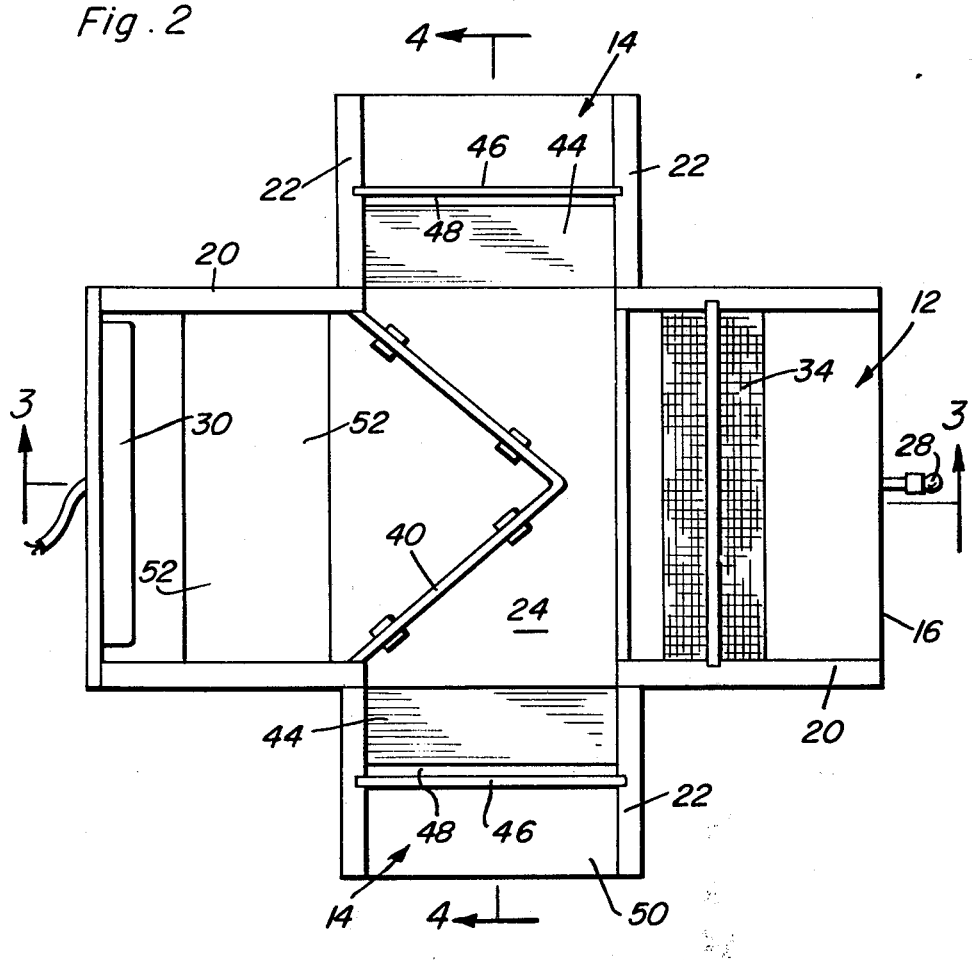
FIG. 2 is a top plan view of the trap with the top wall removed.
Figure 3:
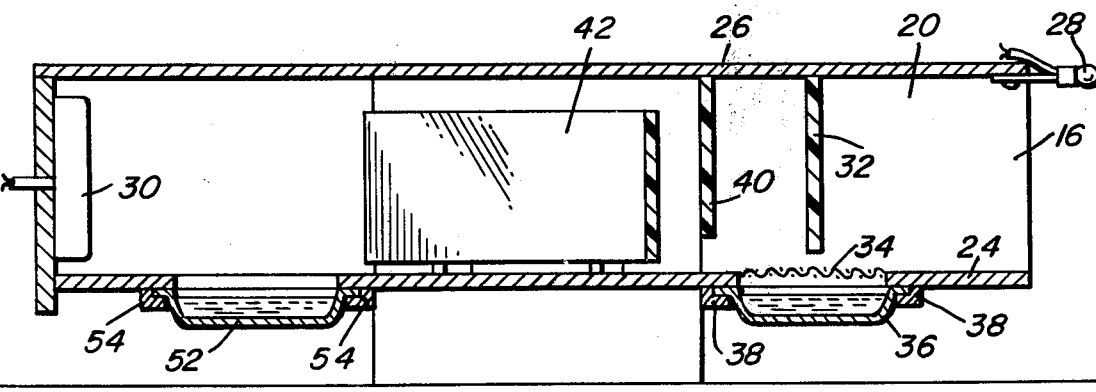
FIG. 3 is a front-to-rear sectional view of the trap taken substantially on a plane passing along line 3—3 in FIG. 2.

Referring now more specifically to the drawings, reference numeral 10 is used to designate the trap. The trap 10 consists of a main elongated passage 12 and a pair of laterally directed passages 14 communicated with the main passage at approximately midway along the length thereof.

The main passage 12 includes an open entrance end 16 and, at the second end, and end wall 18. The opposed sides of the main passage 12 are defined by side walls 20, each including an opening midway along the length thereof for communication with the lateral discharge passages 14, each of which is also defined by a pair of side walls 22. A bottom wall or floor 24 extends along the length of the main passage 12. A top wall 26 completely covers both the main passage 12 and the lateral discharge passages 14. All of these wall members are of an appropriate light excluding material, such as for example wood, and define a light-tight enclosure.

The insects are initially attracted to the trap 10 by an appropriate light 28 mounted at the entrance end 16 of the main passage 12. The insects are induced to move into and along the interior of the trap 10 by an appropriate insect attracting black light unit 30 mounted on the end wall 18 interiorly of the main passage 12. Both this unit 30 and the light 28 can be battery powered for field use and, if deemed desirable, can be provided with appropriate automatic switches for operation only during periods of peak insect activity. For example, a photoelectric switch can be utilized to turn the light on during the day and off at night.

A first transparent barrier 32 is provided transversely across the main passage 12 inward of the entrance end 16 thereof. This barrier depends downwardly from the top wall 26, terminating in spaced relation above the floor or bottom wall 24. The floor 24, for a distance to both sides of the barrier 32, is provided with an enlarged opening therein covered by a screen 34, forming in effect an apertured floor section. A pan 36, filled with an appropriate insect destroying solution, such as for example oil, is slidably mounted beneath the screened section of the floor by means of opposed guides 38 which receive laterally directed side flanges on the pan 36. The space in-between the lower edge of the barrier 32 and the screen 34 is such so as to require the insects to crawl along the screen 34. In doing so, many of the smaller insects will drop through the screen apertures and be destroyed in the pan there beneath. The relatively large leafcutter bees, on the contrary, will move freely thereover.

A second or intermediate transparent barrier 40 extends between the side walls 20 inward of the first or front barrier 32. The intermediate barrier 40 also extends downward from the top wall 26 and terminates in a lower edge spaced upward from the floor 24 a distance slightly greater than the spacing of the front barrier 32 from the floor. The intermediate barrier 40 is located inward of the screened opening and overlies the solid floor, forcing the insects to crawl or otherwise move there beneath.

Once beyond the intermediate barrier 40, the insects encounter a transparent diverting barrier 42. The diverting barrier 42 is of a generally V-shaped configuration having a forwardly located vertex and diverging sides which extend to and terminate at the main passage side walls 20 at the rear of the two side wall openings which define the lateral passages 14. Incidentally, it will be noted that the intermediate barrier 40 aligns with the forward edges of these openings through the side walls 20. This diverting barrier has the upper edge thereof spaced approximately one inch downward from the top wall 26 and the lower edge spaced approximately 1/16th inch above the floor. This floor-to-barrier spacing is insufficient so as to allow for passage of the leafcutter bees. Thus, as the leafcutter bees move under the barrier 40 and attempt to go to the black light source 30, they follow along the diverging walls of the diverter barrier 42 and ultimately move to one or the other of the lateral discharge passages 14 where they encounter a sharp downwardly sloping floor portion 44 terminating short of a vertical transparent panel 46 so as to define a discharge slot 48. The transparent panel 46 closes off the end of the corresponding lateral discharge passage 14, being sealed to the passage side walls 22, the top wall 26 and a bottom wall 50 extending between the side walls 22 outward from the transparent barrier panel 46. As the leafcutter bees are diverted toward either of the lateral passages 14, light entering through the transparent wall or partition 46 draws them outward. This attraction of the leafcutter bees, and the sharp inclination of the floor section 44 ensure a positive and effective discharge of the leafcutter bees through the slot 48 from the trap 10. The remaining smaller insects, and in particular the Sapyga wasps, either crawl beneath the diverting barrier 42 or ultimately crawl or fly thereover, attracted by the black light unit 30. Once beyond the barrier 42, an enlarged opening is provided through the floor 24 with an underlying pan 52 containing an insect destroying medium such as oil. This pan 52 is also removably mounted by an engagement of the pan side flanges within a pair of opposed guides 54. It is contemplated that the various transparent barriers be made of plexiglass with the black light unit 30 being clearly visible throughout the length of the main passage so as to induce a continued movement of the insects therethrough. The diverting barrier 42, can, as an alternative, be formed of screening or other perforated means wherein the apertures are of a size so as to allow for movement of small insects, including Sapyga wasps, therethrough while excluding the larger desirable leafcutter bees which will be laterally diverted in the manner described above.

If so desired, the trap 10 can be mounted within an enlarged housing with the entrance opening 16 communicating to the exterior of the housing through an opening therein. In such a case, it will of course be appreciated that appropriate supports will be provided so as to mount the trap. From the foregoing, it will be appreciated that a highly effective device has been devised for trapping insects, and more particularly separating the highly useful leafcutter bee from its primary predator the Sapyga wasp. This is effected through the employment of a system wherein no moving parts are required, reliance being had solely upon a unique arrangement of insect directing barriers in conjunction with means for inducing movement of the insects along a predetermined path.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for selective destruction of insects comprising an insect passage, an insect receiving entrance at one end of the passage, the second end of the passage being closed, attracting means for inducing movement of insects along said passage, means for diverting selected insects outward of said passage, insect destroying means within said passage beyond the means for diverting selected insects and before the attracting means, said passage including a floor, said means for diverting selected insects including a diverting barrier transversely across said passage and spaced above the floor thereof a predetermined distance sufficient so as to allow passage of all but selected insects, and a lateral discharge passage arranged laterally of the insect passage before the diverting barrier, attracting means and insect destroying means.

2. Apparatus for selective destruction of insects comprising an insect passage, an insect receiving entrance at one end of the passage, the second end of the passage being closed, means for inducing movement of insects along said passage, means for diverting selected insects outward of said passage, insect destroying means within said passage beyond the means for diverting selected insects, said passage including a floor, said means for diverting selected insects including a diverting barrier transversely across said passage and spaced above the floor thereof a distance sufficient so as to allow passage of all but selected insects, and a lateral discharge for the selected insects, a front barrier inward of the entrance and forward of the diverting barrier, said front barrier being spaced above the floor whereby incoming insects are forced to crawl beneath said front barrier, said floor, beneath the front barrier, being apertured for the passage of small insects therethrough, and insect destroying means below the apertured portion of the floor.

3. The apparatus of claim 2 including an intermediate barrier beyond the front barrier and forward of the diverting barrier for forcing insects to move along the floor to said diverting barrier.

4. The apparatus 3 wherein the means for inducing movement of insects along the passage comprise a black light unit mounted at the closed second end of the passage, said front, intermediate and diverting barrier being transparent.

5. The apparatus of claim 4 wherein the lateral discharge for the selected insects includes a downwardly sloping floor section and a discharge opening at the outer end thereof, said lateral discharge including an end wall outward of and spaced from the sloping floor section to define the discharge opening.

6. Apparatus for selective destruction of insects comprising an insect passage, an insect receiving entrance at one end of the passage, the second end of the passage being closed, means for inducing movement of insects along said passage, means for diverting selected insects outward of said passage, insect destroying means within said passage beyond the means for diverting selected insects, a floor, said means for diverting selected insects including a diverting barrier transversely across said passage and spaced above the floor thereof a distance sufficient so as to allow passage of all but selected insects, and a lateral discharge for the selected insects, the lateral discharge for the selected insects including a downwardly sloping floor section and a discharge opening at the outer end thereof, said lateral discharge including an end wall outward of and spaced from the sloping floor section to define the discharge opening.

* * * * *